US012641703B2

(12) United States Patent
Engel et al.

(10) Patent No.: US 12,641,703 B2
(45) Date of Patent: May 26, 2026

(54) MONITORING THE STATE OF AN X-RAY TUBE

(71) Applicant: KONINKLIJKE PHILIPS N.V., Eindhoven (NL)

(72) Inventors: Klaus Jürgen Engel, Veldoven (NL); Gereon Vogtmeier, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 204 days.

(21) Appl. No.: 18/708,343

(22) PCT Filed: Nov. 3, 2022

(86) PCT No.: PCT/EP2022/080644
§ 371 (c)(1),
(2) Date: May 8, 2024

(87) PCT Pub. No.: WO2023/083680
PCT Pub. Date: May 19, 2023

(65) Prior Publication Data

US 2025/0016903 A1 Jan. 9, 2025

(30) Foreign Application Priority Data

Nov. 11, 2021 (EP) .................................... 21207705

(51) Int. Cl.
*H05G 1/54* (2006.01)
*H05G 1/26* (2006.01)
*H05G 1/28* (2006.01)

(52) U.S. Cl.
CPC ............... *H05G 1/54* (2013.01); *H05G 1/265* (2013.01); *H05G 1/28* (2013.01)

(58) Field of Classification Search
CPC ............. H05G 1/54; H05G 1/265; H05G 1/28
See application file for complete search history.

(56) References Cited

U.S. PATENT DOCUMENTS 4,601,051 A * 7/1986 Santurtun ................ H05G 1/32 378/118
2012/0039443 A1* 2/2012 Behling .................. H05G 1/54 378/113

(Continued)

FOREIGN PATENT DOCUMENTS

CN 109378265 A 2/2019
EP 3076873 B1 10/2016

(Continued)

OTHER PUBLICATIONS

PCT International Search Report, International application No. PCT/EP2022/080644, Feb. 23, 2023.

*Primary Examiner* — Kiho Kim
(74) *Attorney, Agent, or Firm* — Larry Liberchuk

(57) ABSTRACT

Systems and methods are provided for monitoring the state of an x-ray tube (100). The method comprises: receiving sensor data from a sensor array apparatus (120) positioned to observe at least part of a surface of an anode (102) of the x-ray tube; processing the received sensor data to identify and quantify surface damage to the anode; storing the identified and quantified surface damage with a time stamp; and correlating the identified and quantified surface damage to one or more usage protocols in an operational history record of the x-ray tube and used at a time corresponding the time stamp and/or used at a time in between time stamps.

14 Claims, 4 Drawing Sheets

(56) References Cited

U.S. PATENT DOCUMENTS

| | | | | |
|---|---|---|---|---|
| 2012/0082294 | A1 | 4/2012 | Virshup | |
| 2013/0083901 | A1 | 4/2013 | Grasruck | |
| 2013/0223594 | A1 * | 8/2013 | Sprong | H05G 1/30 378/140 |
| 2014/0177810 | A1 | 6/2014 | Gao | |
| 2016/0183907 | A1 * | 6/2016 | Behling | H01J 35/00 378/207 |

FOREIGN PATENT DOCUMENTS

| | | | |
|---|---|---|---|
| EP | 3384737 | B1 | 9/2019 |
| WO | WO2016087394 | A1 | 6/2016 |
| WO | WO2017093045 | A1 | 6/2017 |

* cited by examiner

MONITORING THE STATE OF AN X-RAY TUBE

FIELD OF THE INVENTION

The invention relates to systems and methods for monitoring the state of an x-ray tube, for controlling an x-ray tube based on said monitoring, and for performing imaging using a so-controlled x-ray tube.

BACKGROUND OF THE INVENTION

X-ray tubes are used for a variety of medical and industrial imaging processes. High-power x-ray tubes typically comprise a rotating anode disk serving as a target for an electron beam. During use, the target area on the anode disk experiences high thermal stress leading to mechanical surface damage, or "tube aging", in the form of micro-cracks and roughening of the surface. The surface damage modifies the emitted x-ray spectrum and causes a loss of x-ray intensity, with ramifications for imaging system calibration and image quality. The anode disk will ultimately need to be replaced, which consumes material and service resources and causes system downtime.

WO2016/087394A1 relates to a system for generated spectral CT projection data. Spectral properties of the radiation device can be monitored overtime, wherein this information can be used for, for instance, correcting the spectral computed tomography projection data, and/or, if undesired spectral properties of the radiation device are indicated, triggering a replacement of the radiation device.

US2013/0223594A1 relates to determining changes in the X-ray emission yield of an X-ray tube, in particular determining dose degradation. An X-ray sensor is arranged within the beam formation and measures the X-ray intensity for a specific direction of X-ray emission with an angle with respect to the central axis. The dose degradation may be an indicator of aging of the anode.

Currently, system failures related to tube aging cannot be well explained or reproduced by the manufacturer. Such failures can trigger not only high repair/replacement costs but can also negatively affect workflow or system safety.

SUMMARY OF THE INVENTION

It is an object of the invention to better address one or more of these concerns. The invention is defined by the independent claims. The dependent claims define advantageous embodiments.

A first aspect of invention provides a method for monitoring the state of an x-ray tube. The method comprises: receiving sensor data from a sensor apparatus positioned to measure radiation from at least part of a surface of an anode of the x-ray tube; processing the received sensor data to identify and quantify surface damage to the anode; storing the identified and quantified surface damage with a time stamp; and correlating the identified and quantified surface damage to one or more usage protocols in an operational history record of the x-ray tube and used at a time corresponding the time stamp and/or used at a time in between time stamps.

The "x-ray tube" may be any tube whose anode is susceptible to damage during use. In one particular example, described herein, the x-ray tube is a rotating anode tube, but it will be understood that the systems and methods described herein are applicable to other forms of tube such as Crookes tubes, Coolidge tubes, or microfocus tubes.

By "state" is meant a condition of the x-ray tube, in particular that of the surface of the anode, more particularly that of the target area (or x-ray source area) of the anode surface. The state may relate to a state of aging, i.e. to the extent of damage or degradation exhibited by the anode surface. As is known in the art, the surface of the anode degrades during use due to thermal stress, with the said "surface damage" that results including cracking or roughening of the anode surface.

The "sensor data" can be any data whereby such surface damage can be identified. The sensor data may thus comprise values for at least one parameter which is indicative of surface damage. Parameters indicative of surface damage may comprise for example, the x-ray intensity, the x-ray spectrum, or both. Preferably, the sensor data allows values of at least one parameter indicative of surface damage to be determined as a function of at least one spatial parameter. Thus, not only the presence of surface damage but also its location and severity may be identified. In one particular example, the spatial parameter is disk radius. In this example, a damage-indicating parameter such as intensity and/or spectrum may be determined as a function of disk radius.

Accordingly, the "sensor apparatus" may comprise any suitable sensor or sensor array for providing such sensor data. Particular examples of the sensor apparatus are described further below. By "positioned to measure radiation from" is meant that the sensor apparatus is so positioned as to receive at least a portion of radiation emanating from the anode surface. That radiation in some examples comprises x-rays, with the sensor being positioned so as to intercept at least a portion of the main x-ray beam used for imaging, and/or at least a portion of one or more ancillary or side beams. Additionally or alternatively, the radiation may comprise radiation from other parts of the electromagnetic spectrum such as infrared or visible light detected via one or more corresponding sensors.

Processing the received sensor data to identify and quantify surface damage to the anode may comprise measuring values of one of more damage-indicating parameters and detecting deviations in those values which indicate surface damage. A quantity of surface damage may be a value on a scale, e.g. to quantify states of gradual anode surface damage. In cases where damage is binary (yes or no), the quantified damage data may be limited to 0 or 1. For example, surface damage may be identified based on deviations in e.g. x-ray intensity and/or x-ray spectrum values over time. For example, X-ray intensity might be detected by indirect scintillation (e.g. CsI) detectors, which convert X-ray photons into an energy-proportional number of visible light photons, which could be detected by common photosensitive detectors; alternatively, X-ray intensity could be detected by direct conversion detectors, which convert X-ray photons into an energy-proportional number of electron-hole pairs in a semiconductor, producing a measurable charge pulse by application of an electric field. For example, the X-ray spectrum can be detected using a collimator combined with at least two intensity sensors monitoring the same portion of the surface, from which at least one sensor receives X-ray intensity having passed an X-ray filter (e.g. made of Cu), characterized by hardening the spectrum of the passing beam. In this case, the intensity ratios of the at least two sensors become dependent on the initial X-ray spectrum, therefore variations in intensity ratios are indicative for modifications of the tube spectrum due to damage of the local surface portion. Additionally or alternatively, values of such parameters may be compared to one or more reference datasets to identify surface damage progress based on deviations in the measured values from the reference values. One such reference data may comprise a reference spectrum indication, as for example an alternate set of measured values acquired at the same time as the first set but using at least one filter. The said deviations may comprise differences or changes in values exceeding a threshold. Identifying surface damage may comprise identifying not only the presence of surface damage, but also its location, in at least one spatial dimension. Thus, identifying the surface damage may comprise determining values of at least one damage-indicating parameter as a function of at least one spatial parameter, such as disk radius. For example, the sensors can be configured in form of an array and combined with a beam collimator (e.g. following the hole-camera principle) such that array sensor elements can monitor different portions of the X-ray emitting surface. Damage location may be identified in at least two spatial dimensions, providing e.g. x/y resolution. Thus, processing the received sensor data to identify and quantify surface damage to the anode may comprise performing (e.g. spatially-resolved) x-ray intensity monitoring using the received sensor data, and/or performing x-ray spectral monitoring using the received sensor data. Monitoring may comprise identifying asymmetric surface damage regions. For example, on a rotating anode disk, an exposure with an electron beam heats up a ring-shaped focal track area, whereas the thermal load can cause a structural material rearrangement along the track, causing a surface roughening and cracks in the material. "Spatially asymmetric damage regions" in such a case may refer to the observation of a similar degree of surface damage along the rotation direction, while the degree of surface damage might vary along the radial direction according to different thermal loads applied in history. Monitoring of asymmetric surface damage may provide further information about the induced thermomechanical stress and the next expected surface modifications. The method may thus comprise predicting future surface modifications based on the currently monitored surface damage, and in particular that occurring in the radial direction versus that in the direction perpendicular thereto. This information may furthermore be used to obtain quantitative information about the geometry of the anode surface, especially that of the focal track, along the radius and perpendicular thereto, information which may be used to predict consequences for the x-ray generation. Identifying and quantifying the surface damage may comprise identifying spatial asymmetry in anode aging. Such spatial asymmetry might lead to an inhomogeneous focal spot (in terms of intensity and energy), which could lead to an inhomogeneous x-ray beam across the field of view, which in turn reduces image quality and/or impacts image interpretation especially if image correction schemes rely on a different (e.g. historical) focal spot status. Spatial inhomogeneity along the focal track could also lead to regularity changes (in the rotation rate of the anode) and local hot spots or effects on the anode which themselves lead to mechanical cracking of the anode surface.

The "storing" of the identified and quantified surface damage information may comprise storing the relevant data relating to surface damage in e.g. a short or long term memory, a data store or similar. Thereby, both present and past surface damage may be available for analysis. The surface damage data comprises a time stamp or similar for trend analysis and correlation with other data history.

By "usage protocol" is meant a particular constellation of operating parameters of the x-ray tube, for example one or more of focal spot size, focal spot position, focal spot shape, intensity (e.g. tube voltage and anode current), exposure duration, thermal load (of x-ray source area), and so on. A usage protocol may alternatively be referred to as an exposure mode.

The "correlating" may comprise determining or quantifying an effect of the said one or more usage protocols on surface damage, which may influence image quality. The correlating may comprise determining or quantifying an effect of the said one or more usage protocols on the state (e.g. aging state) of the anode. Additionally or alternatively, the correlating may comprise determining or quantifying an effect of the said one or more usage protocols on anode surface problems, e.g. cracks, surface roughness. Damage may be correlated individually to particular protocols, or to combinations of protocols, or both. Thus, in one example, the correlating comprises determining severity of the surface damage per protocol for at least one of the usage protocols. For example, the progress of monitored surface damage according to sensor data (e.g. delta-steps of intensity decrease) can be calculated for time intervals where a certain suspected usage protocol is used and compared to the corresponding progress of surface damage when other usage protocols are used. In such a way, the severity of certain usage protocols regarding surface damage progress can be quantified and related to each other. Additionally or alternatively, the correlating may comprise determining severity of the surface damage for at least one combination of the usage protocols. Particular protocols or combinations thereof may thus be identified as malicious protocols. Correlation, an identified relationship, may be determined e.g. between current usage protocol(s) and current surface damage, or between current and past surface damage and a history of usage protocol(s), or past surface damage and a past history of usage protocol(s), and/or surface damage over time and a history of usage protocol(s) over time. Identified and quantified surface damage at a certain time point may thus be correlated to one or several usage protocol(s) used at or around that time point. In this case the one or several usage protocols are used at a time corresponding to a time of a time stamp of the surface damage. It is possible that the corresponding time is slightly before or slightly after the time of the time stamp, such that a relationship between the usage protocol(s) and surface damage can still be found. Preferably, multiple identified and quantified surface damage data points are correlated to multiple usage protocol data points such that trends can be analyzed and/or extrapolated. When multiple data points are used for analysis, it becomes less important for the time stamps and time points of usage protocols to match in order to find a correlation. Identified and quantified surface damage at two or more time stamps, e.g. the change in surface damage between two time stamps, may be correlated to one or several usage protocols used at a time or time period in between the time stamps. The one or several usage protocols used at a time preceding a time stamp of identified and quantified surface damage may be correlated to e.g. a change in surface damage as compared to an earlier time stamp.

As an example, there may be correlation of the energy density that is applied to the surface of the anode and local melting/remelting of the metal, which will lead to changing surface roughness. Such surface roughness may have an impact on the x-ray generation compared to x-ray generation from a flat surface. Said energy density onto the anode may be determined by the electron beam specifics such as electron density, electron energy, beam duration, focal spot size and also impacted by e.g. focal spot movement, but depends also on the ability of the anode to dissipate energy from the anode surface. Therefore, the protocol setting (such as but not limited to kV, mA in combination with focus setting, focus quality and radiation time) and a remaining thermal load from preceding tube usage will influence the anode aging. Past and present protocol settings are part of the summed-up history information that may be used to identify correlation. When direct and/or indirect anode surface roughness effects are identified, such information may be leveraged to optimize the image/beam quality of imaging scans. For example, an alternative protocol setting may be selected, which is a trade-off between image quality and further acceleration of aging effects. For example, the alternative protocol setting might decrease a local thermal peak load by increasing the spot size, and/or by reducing the X-ray intensity (e.g. voltage or current), and/or by reducing the pulse time. Results of measurements of the anode focal track area may also show or indicate how the X-ray tube has been operated in the past. By way of example, anode roughening along a narrow track might be correlated to a main operation mode with a small focal spot, in case of "extended roughness" also the larger focal spot with high intensity has been used. Thus, this kind of correlations may link the measurement signal to modes of how the tube has been operated. E.g., in case of "roughness peaks" (cracks) that are homogenously distributed or only at certain positions, this may be correlated to high pulse peak power or more continuous operation and the cracks initiate a different "fingerprint" of the x-ray beam generated. This may lead to a different spatial distribution and/or may influence X-ray self-absorption in the anode material forming a different x-ray spectrum (important for spectral imaging). All mentioned effects relate also to the heat capacity and cooling dynamics of the anode. When certain anode aging effects are measured and linked or identified to a reason, then also the follow up action can be more precise, e.g., a slight focus shift to an "unused (or less used)" but still in the correct x-ray anode area located track.

The "operational history record" may comprise any short-term and/or long-term record of the history of operation of the x-ray tube. The record may comprise data relating for example to the above-mentioned operating parameters. The record may further include manufacturing data from the factory and/or operation data from calibration or special purpose runs (e.g. tube conditioning/reconditioning runs).

In the case that the sensor data is obtained in real-time, this may be used to issue one or more warnings, for example during operation of the x-ray tube. In one example, wherein the processing of the received sensor data is performed in real-time, the method further comprises issuing a warning in response to the detection of an acute progression (i.e., rate of progression) and/or an acute extent of the surface damage. The classification of the progression and/or extent of the surface damage as acute may occur in response to expected degradations in image quality, or a quantification of the risk of destroying the anode or tube or permanently damaging the tube, or of the risk of having to stop the scan due to the damage. The warnings may relate not only to the anode or tube, but additionally or alternatively to related equipment such as the high-voltage generator. In one example in which the processing of the received sensor data is performed in real-time, the method further comprises detecting high voltage generator performance changes based on high and/or low intensity levels in the received sensor data. Performance changes may be detected based on one or more thresholds or recognized signal patterns. For example, generator problems might be identified by sudden drops in sensor signals such as X-ray intensity measurements, or (if also spectral sensor data is available) by sudden variations in the X-ray spectrum, which do not match an expected pattern for tube damage. For example, a generator might create a damage pattern where the voltage supplied to the electron accelerator is strongly modulated (as opposed to being ideally constant). The X-ray intensity is expected to drop in this case, and the X-ray spectrum is expected to get significantly softer, but differently softer as compared to a tube anode damage, manifesting in sensor data significantly different to that of a reference sensor data set, and also significantly different to that of an expected data set for an anode damage incident. In another example, in case that spatially resolved sensor data is available, it can be examined if the signal drop occurs simultaneously for all monitored focal spot locations (more specifically, also in regions which are unlikely to be affected by a surface damage), therefore indicating that the origin of intensity drop is related to a damage of the generator. In one particular example, detecting high voltage generator performance changes further comprises identifying a close-to-arcing state of the high voltage generator based on the intensity levels, and issuing a corresponding warning and/or taking preemptive action. For example, a close-to-arcing event might be preceded by changes in the vacuum condition and/or changes in the conductivity between the components with different voltage potential (anode, cathode or ground path) and therefore creating leakage currents which for a constant hold current implies that the electron beam generates less X-ray intensity, which can be monitored by the sensors. In such a case the voltage pattern may still be in a "healthy" state such that only an X-ray intensity decrease is observed but no spectral softening is observed.

The method of the first aspect may comprise implementing one or more tube-lifetime extension measures based on the monitored state of the x-ray tube.

A second aspect of the invention provides a method of controlling an x-ray tube, the method comprising: performing the method of the first aspect to monitor the state of the x-ray tube; and implementing one or more tube-lifetime extension measures based on the monitored state of the x-ray tube.

In one example of the first and/or second aspect, implementing the one or more tube-lifetime extension measures comprises adapting one or more of the usage protocols to prolong tube life. For example, adapting the one or more of the usage protocols may comprise adapting a cooling cycle of the x-ray tube to prolong tube life, for example by increasing a required cooling time before the next scan is carried out. Additionally or alternatively, adapting one or more of the usage protocols may comprise adapting one or more focal spot parameters, such as size, shape, position, and intensity. For example, the focal spot parameters may be adapted to shift the focal spot position, e.g. away from the surface damage. In one example, the focal spot parameters may be adapted to facilitate re-melting of the anode, for example by adjusting an intensity of the beam to create a heating effect on the anode surface and its material structure, and/or by shifting the focal spot position to a position at which re-melting of the anode in the region of the surface damage is enabled. In this regard, power (i.e., kV/mA) may be increased and/or beam size reduced to an extent at which melting of the anode at a defined position occurs. This may be performed during imaging if it is compatible with the scan being performed. More likely is that the higher dose and resulting image would not be compatible with imaging of a patient, such that a repair or reconditioning scan may be performed to carry out the re-melting. Additionally or alternatively, the focal spot parameters may be adapted to adjust (e.g. reduce) the focal spot size. Additionally or alternatively, the focal spot parameters may be adapted to adjust intensity, for example by performing real-time intensity control. In any of the above examples, a predictive control algorithm may be implemented to optimize focal spot parameters, e.g. intensity, to compensate for modulation effects due to the surface damage. In any case, implementing the one or more tube-lifetime extension measures may comprise implementing one or more tradeoffs to favor tube life over other parameters, such as image quality. In one such example, implementing the one or more tube-lifetime extension measures comprises implementing one or more tradeoffs in intensity and/or spot size at the expense of image quality. In this way, the quality e.g. spatial resolution of the image may be reduced, but the measures allow the scan to continue running. Measures may be implemented in combination, for example in a progressive or structured manner. For example, a scan may be preceded by internal repair methods (such as heat treatment of the anode surface with the x-ray beam and focal spot shaping). After operating the imaging system with a certain performance to carry out the scan, a switch to limited performance may be made based on the monitored tube state. In the worst-case scenario, the scan ends with (or is interrupted by) service action to replace the tube or anode. When operating with altered performance, information relating to the modified parameter settings may be used by an imaging system to compensate via image processing as far as possible. Thus, methods of the present disclosure may further comprise the step of outputting, to an imaging system, information relating to modified parameter settings for use in image processing or image correction, and/or the step of the imaging system using said information to perform image processing or image correction. Any of the methods described herein may further comprise adapting the clinical workflow, or prompting the user or another system to make such an adaptation, when adapting the system performance. For example, scans with intensity reduction due to system adaptation may no longer be usable in conjunction with patients whose bodily dimensions exceed certain thresholds, for example in terms of bodily thickness. Equivalently, high power settings may be impermissible in conjunction with certain patients or applications.

The method of the first and/or second aspect may be computer implemented.

A third aspect provides a system configured to perform the method of the first and/or second aspect. The system may comprise an x-ray tube monitoring system and/or an x-ray tube control system. The monitoring system and the control system may be the same system. The system of the third aspect may be a computer-implemented system, being implemented for example by a computing device as described herein. In this way, the third aspect may provide a computing device comprising a processor configured to perform the method of the first and/or second aspect. In other examples, the system may be implemented using hardware only, or a combination of hardware and software.

A fourth aspect provides a computer program product comprising instructions which, when executed by a computing device, enable or cause the computing device to perform the method of the first and/or second aspect.

A fifth aspect provides a computer-readable medium comprising instructions which, when executed by a computing device, enable or cause the computing device to perform the method of the first and/or second aspect.

A sixth aspect provides a sensor apparatus for use with the systems and methods described herein. The sensor apparatus may comprise a first linear array configured to provide a measurement of x-ray intensity as a function of at least one spatial parameter, for example anode radius. The sensor apparatus optionally further comprises a second linear array equipped with a filter for spectral detection of the surface damage. The sensor apparatus may be integrated into the x-ray tube, or may be provided in the form of a replaceable sensor module that can be connected to and disconnected from the tube, or to some other structure allowing it to observe the tube, as required. The sensor apparatus may be universally applicable for a dedicated tube type, i.e. when mounted in different imaging systems. The sensor apparatus may form part of the system of the third aspect, with the resulting system thus forming as an (image-based) (tube or anode) inspection system. The inspection system may alternatively be viewed as comprising: the system of the third aspect; and a sensor apparatus positionable to measure radiation from at least part of a target surface of the anode of the x-ray tube.

A seventh aspect provides an x-ray tube comprising the system of the third aspect and/or the sensor apparatus of the sixth aspect.

An eighth aspect provides an imaging system comprising one or more of the systems of the third aspect, the sensor apparatus of the sixth aspect, and the x-ray tube of the seventh aspect.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

Correlating the identified damage to one or more usage protocols in the operational history record enables certain exposure conditions to be recognized under which tube aging rapidly accelerates, with that recognition currently being infeasible given the complexity of current usage protocols together with strongly customized usage statistics. Currently, system failures related to tube aging cannot be well explained or reproduced by the manufacturer. Such failures can trigger not only high repair/replacement costs but can also negatively affect workflow or system safety (for instance, if such a failure occurs, in the worst-case scenario, during a medical interventional procedure). Systems and methods disclosed herein enable such failures to be explained and concomitantly serve to minimize repair costs.

Implementing tube-lifetime extension measures increases the tube lifetime by minimizing the effect of tube aging, for example by adapting usage protocols of the tube. For instance, the tube lifetime can be increased by avoiding extreme tube loads, by adapting the size of the target area, or by adapting the cooling times.

Adaptation of the cooling cycle and re-melting of the anode enable the provision of smart tube concepts. The systems and apparatus disclosed herein may readily be mounted in or on the tube housing and offer functionality enabling a smart tube or imaging system.

Systems and methods disclosed herein may further facilitate implementation of a digital twin, which obtains an up-to-date system status from real-time sensors in the physical imaging system to adapt in-field conditions, allowing a potentially user-customized imaging system to be virtually copied and accessible to the manufacturer for enhanced prediction and maintenance performance.

BRIEF DESCRIPTION OF THE DRAWINGS

A detailed description will now be given, by way of example only, with reference to the accompanying drawings, in which.

DETAILED DESCRIPTION OF EMBODIMENTS

Figure 1A:
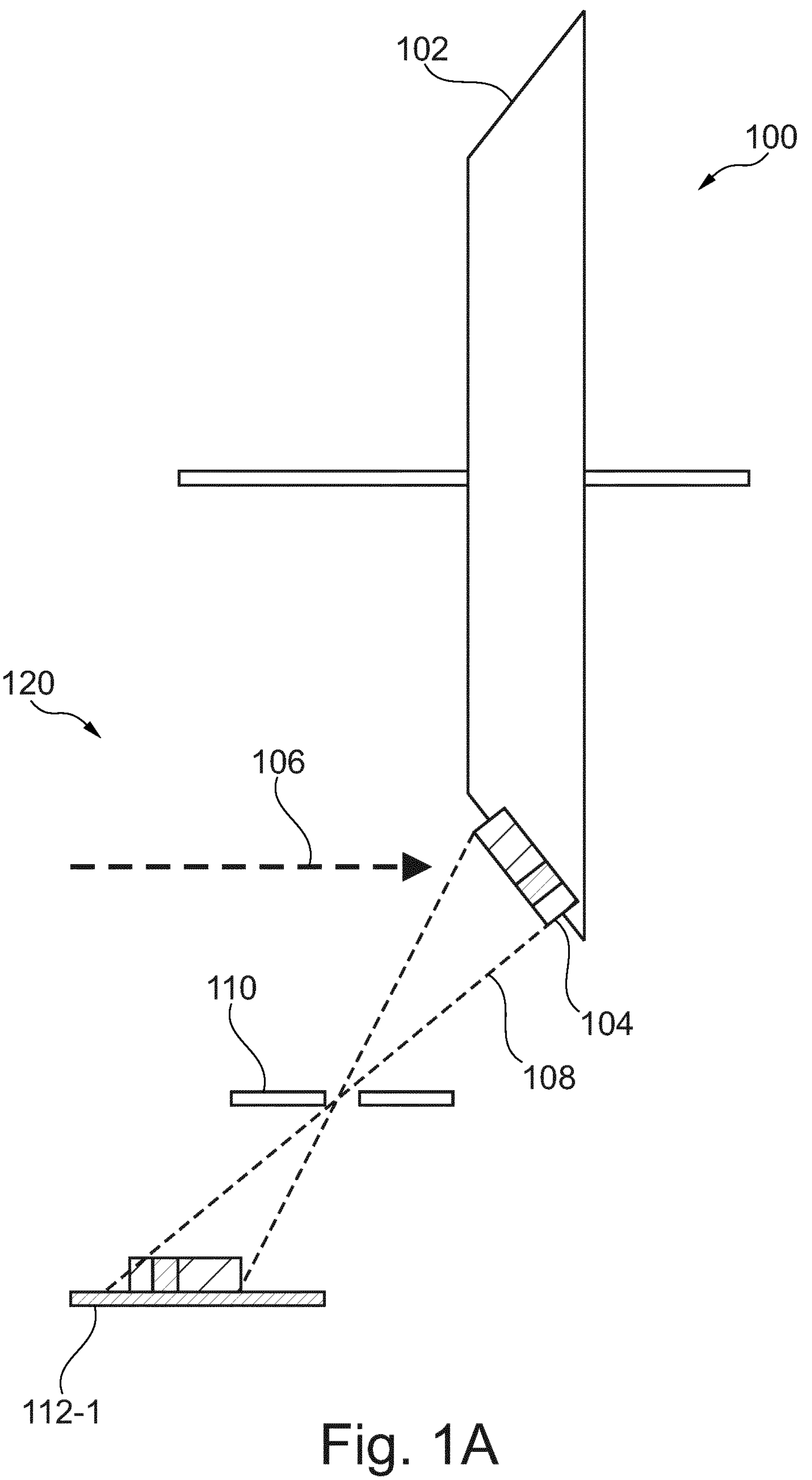
FIGS. 1A and 1B illustrate monitoring of the state of an x-ray tube.

FIG. 1A illustrates an x-ray tube 100 comprising a rotating anode disk 102 having an x-ray focal spot or track area 104 which collects an electron beam 106 emitted by a cathode (not shown) and which emits part of an x-ray beam 108. The x-ray beam 108 passes through a pinhole camera 110 before arriving at a first linear detector array 112-1, creating thereby an image of the track area 104. FIG. 1A shows a sideview of the x-ray tube 100 along a direction perpendicular to an axis of rotation of the anode disk 102.

Figure 1B:
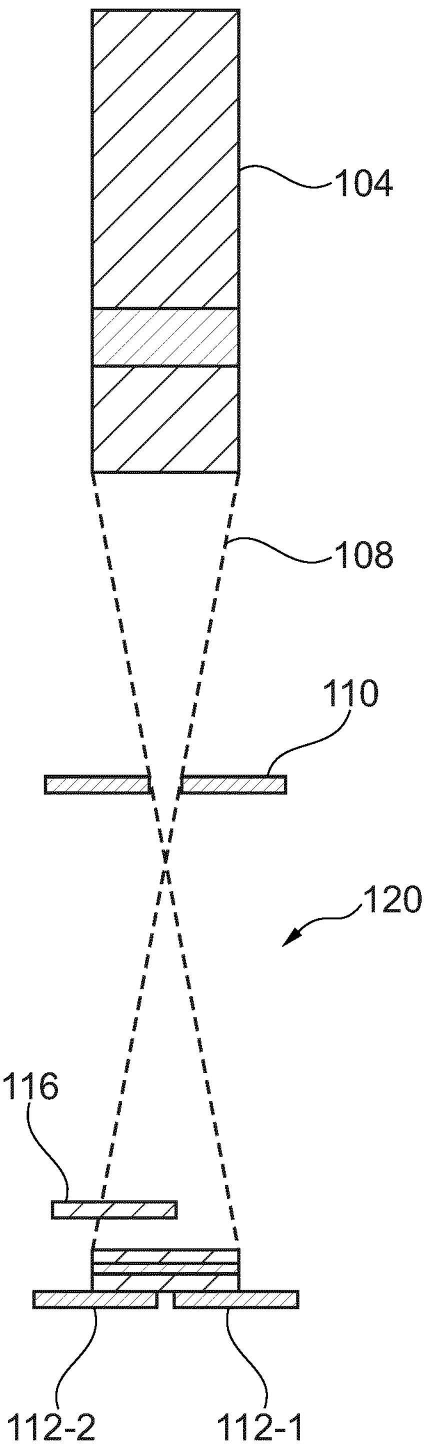

FIG. 1B is a view along a direction parallel to the rotation axis. As shown in FIG. 1B, a second linear detector array 112-2 is provided alongside the first, with a half-sided filter 116 being interposed between the second linear detector array 112-2 and the pinhole camera 110 to filter the x-ray beam 108, while the x-ray beam arriving at the first linear detector array 112-1 remains unfiltered. The pinhole camera 110, detector arrays 112-1, 112-2, and filter 116 form part of a sensor apparatus 120 for x-ray tube aging monitoring. The sensor apparatus 120 in this example monitors the spatial radial profile of the x-ray emission area. The first linear detector array 112-1 provides a measurement of the x-ray intensity distribution versus anode disk radius (i.e. along the cross section of the focal spot track) and can therefore monitor intensity changes during anode lifetime. Surface damage to the anode appears in form of modified intensities as compared to reference measurements for particular exposure settings. In addition, surface damage can be spectrally monitored by the second linear detector array 112-2 equipped with the filter 116 for filtration of the x-ray intensities. The two linear detector arrays thus form a 2×N detector array 112, which monitors surface damage appearing as modified signal ratios of the two columns. The sensor apparatus 120 may be arranged within the tube 100 itself (for example within the tube housing, optionally with shielding e.g. a shield filter to minimize detector damage by high intensity radiation) or alternatively in the vicinity of a tube exit window (not shown). The sensor apparatus 120 is sufficiently compact to enable flexible use in different imaging system setups. In this example, the sensor apparatus 120 is mounted before the beam collimator, without blocking that part of the x-ray beam (not shown) which is emitted by the track area 104 and used for imaging.

In use, real-time sensor data acquired by the sensor apparatus 120 during tube usage is passed to a system for monitoring and/or controlling the x-ray tube 100. A suitable computing device for implementing such a system is described below with respect to FIG. 3. The system 800 may be used to explain x-ray tube aging and failure. The sensor data enables the system 800 to perform spatial (and optionally spectral) monitoring of the emitted x-ray intensity profile cross-sectionally to the emission area (i.e. the focal spot). The anode disk surface roughens and takes microcracks during its lifetime, causing reduced x-ray intensities and modified emission spectra. Spatially resolved intensity monitoring can not only enable local anode disk damage to be identified, but also correlated to usage protocols in an operational history record. In one non-limiting example, the tube 100 is operated with a focal spot broadened to cover a maximum anode disk area such that, via spatial resolution of intensities, disk sections of damaged area are identifiable by comparing the measured intensities with those of disk sections which, in normal exposure modes, are less covered (or not at all) and which therefore provide juvenile intensities and spectra. The measured intensity profiles can thus be used for detection of changes or drift during the lifetime of the tube 100. The spatially resolved spectral measurements allow for analysis of the anode aging as the self-absorption depends on the crack geometry. Asymmetry may be detected by absorption changes of the spectral measurements left and right with respect to the center of the focal spot track.

Figure 2A:
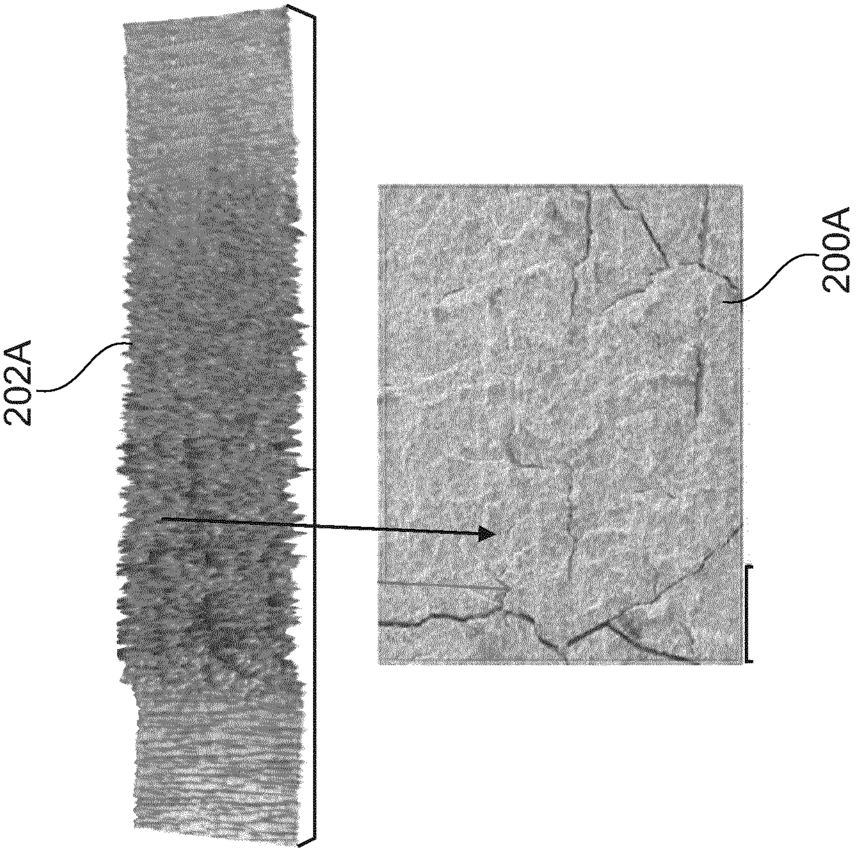
FIGS. 2A and 2B illustrate spectrum modifications resulting from mechanical damage to the surface of an anode disk.
Figure 2B:
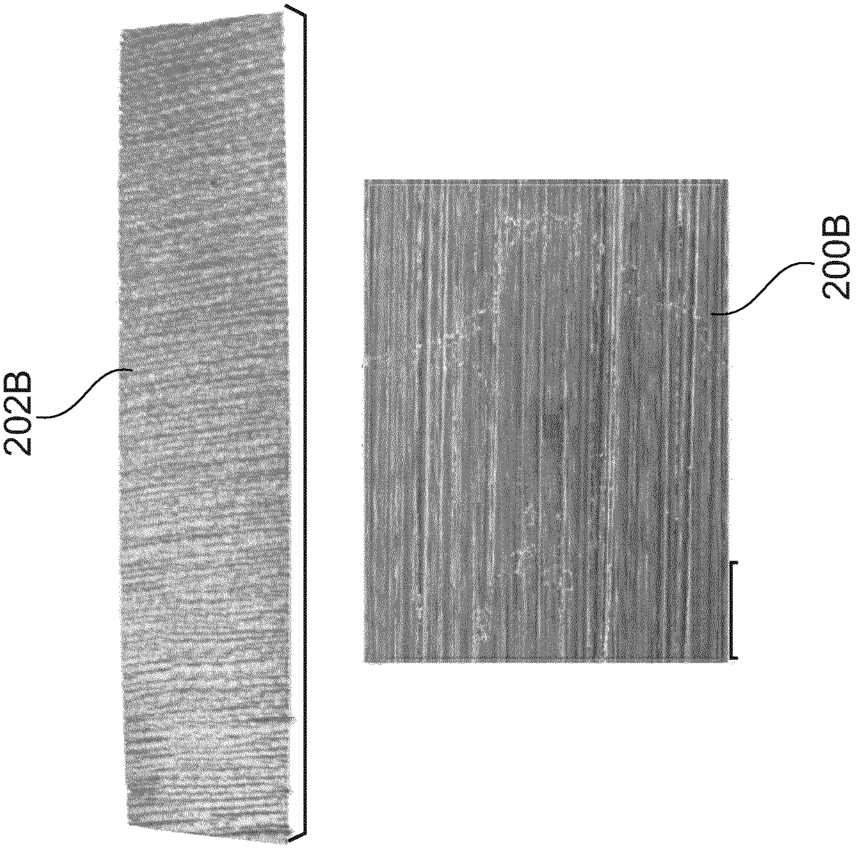

FIGS. 2A and 2B show differences in the roughness of a used anode (FIG. 2A) as compared to a new anode (FIG. 2B). FIG. 2A shows a microphotograph 200A of the used anode while FIG. 2B shows that 200B of a new anode (taken on a middle track). The roughness of the used anode causes spectral changes via self-absorption in the surface structure, as illustrated by the spectra 202A of the used anode versus those 202B of the new anode. Such spectral detection allows effects in the cracks along the rotation direction or perpendicular to the rotation to be separated, providing additional information about the induced thermo-mechanical stress and the next expected surface modifications.

The system 800 may also correlate the monitored surface damage to usage of protocols in the operational history record of the x-ray tube 100, e.g. when using exposure modes involving different size, positions or thermal load of the x-ray source area. The severity of damage per protocol (or for combinations of protocols) can thereby be determined, enabling the recognition of especially malicious usage protocols or combinations thereof.

The system 800 may identify and implement measures for lifetime prolongation. For lifetime extension of the anode, the system 800 may adapt the operation mode of the x-ray system. In one non-limiting example, the system 800 adapts the cooling cycle (i.e. the break between scans) to avoid local overheating. In another non-limiting example, the system 800 enables additional melting and even re-melting ("smart repair") of the anode surface using shifted focal spot positions (implemented for example via quadrupole/electron optics). The system 800 may use the known focal spot position to estimate the influence on the image (dual/quadruple focal spot). Focal spot position may be measured via the sensor apparatus 120. Optionally, additional sensor arrays and filters may be used to acquire more precise spectral information, particularly in the case that two or more focal spot positions are tracked in dual focal spot (DFS)/quadruple focal spot (QFS) mode. The system 800 may perform real-time intensity control to prolong tube life.

Using the real-time monitoring, the system 800 may detect and warn for acute damage to the anode disk 102, e.g. to set a call for maintenance service and avoid system failure during further operation. For instance, the system 800 may issue a warning if acutely progressing surface damage is detected. The system 800 may log data occasionally to provide a long-term reporting of the damage status. The system 800 may in addition monitor intensity peaks (high/low) to provide early detection of high voltage (HV) generator performance changes in combination with the electron beam performance. For example, close-to-arcing events could lead to lower intensities, which may be monitored by the system 800 using the sensor apparatus 120 without interfacing to the high voltage generator.

Systems and methods described herein find application in the fields of x-ray tube aging detection, predicative maintenance, and tube monitoring, being applicable in all kinds of x-ray imaging systems, especially those using rotating anode x-ray tubes.

Figure 3:
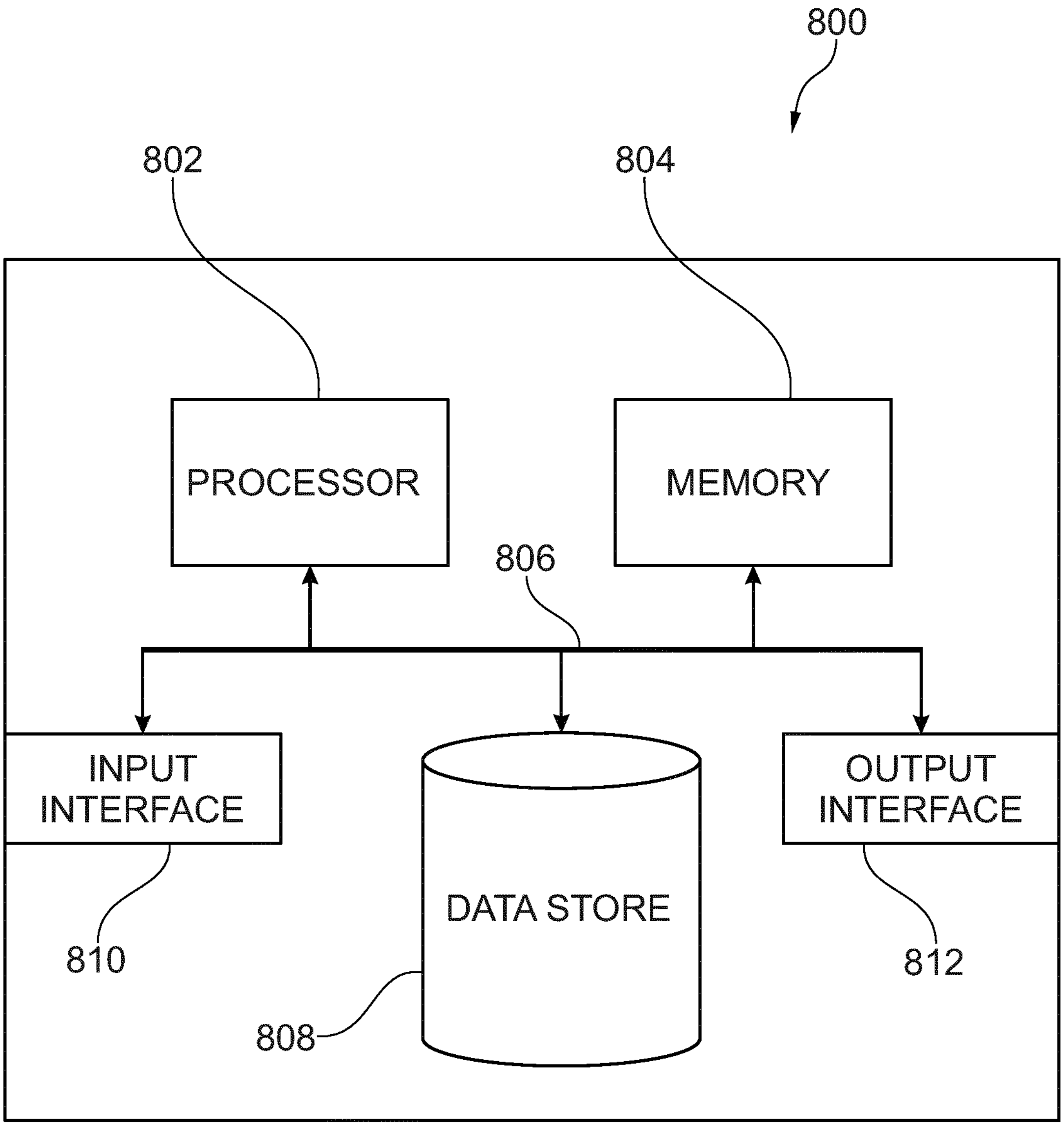
FIG. 3 illustrates a computing device that can be used in accordance with the systems and methods disclosed herein.

Referring to FIG. 3, a high-level illustration of an exemplary computing device 800 that can be used in accordance with the systems and methods disclosed herein is illustrated. The computing device 800 may form part of or comprise any desktop, laptop, server, or cloud-based computing device. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

Measures recited in mutually different dependent claims may advantageously be combined.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "X comprises A and/or B" is satisfied by any of the following instances: X comprises A; X comprises B; or X comprises both A and B.

The invention claimed is:

1. A method for monitoring the state of an x-ray tube, the method comprising:

receiving sensor data from a sensor apparatus positioned to measure radiation from at least part of a surface of an anode of the x-ray tube;

processing the received sensor data to identify and quantify surface damage to the anode;

storing the identified and quantified surface damage with a time stamp; and correlating the identified and quantified surface damage to one or more usage protocols in an operational history record of the x-ray tube and used at a time corresponding the time stamp and/or used at a time in between time stamps.

2. The method of claim 1, wherein the correlating comprises determining severity of the surface damage per protocol for at least one of the usage protocols.

3. The method of claim 1, wherein the correlating comprises determining severity of the surface damage for at least one combination of the usage protocols.

4. The method of claim 1, wherein processing the received sensor data to identify surface damage to the anode comprises performing x-ray intensity monitoring using the received sensor data.

5. The method of claim 1, wherein processing the received sensor data to identify surface damage to the anode comprises performing x-ray spectral monitoring using the received sensor data.

6. The method of claim 1, further comprising identifying spatial asymmetry in anode aging.

7. The method of claim 1, wherein the processing of the received sensor data is performed in real-time, the method further comprising issuing a warning in response to the detection of an acute progression and/or an acute extent of the surface damage.

8. The method of claim 1, wherein the processing of the received sensor data is performed in real-time, the method further comprising detecting high voltage generator performance changes based on high and/or low intensity levels in the received sensor data.

9. The method of claim 8, wherein detecting high voltage generator performance changes further comprises identifying a close-to-arcing state of the high voltage generator based on the intensity levels.

10. The method of claim 1, further comprising:

implementing one or more tube-lifetime extension measures based on the monitored state of the x-ray tube.

11. The method of claim 10, wherein the one or more tube-lifetime extension measures comprise adapting one or more usage protocols, and wherein adapting one or more of the usage protocols comprises adapting a cooling cycle of the x-ray tube to prolong tube life.

12. The method of claim 10, wherein the one or more tube-lifetime extension measures comprise adapting one or more usage protocols, and wherein adapting one or more of the usage protocols comprises adapting one or more focal spot parameters to shift focal spot position away from the surface damage.

13. The method of claim 12, wherein adapting one or more focal spot parameters to shift focal spot position comprising shifting the focal spot to a position at which re-melting of the anode in the region of the surface damage is enabled.

14. A system for monitoring the state of an x-ray tube, comprising:

a memory that stores a plurality of instructions; and a processor coupled to the memory and configured to execute the plurality of instructions to:

receive sensor data from a sensor apparatus positioned to measure radiation from at least part of a surface of an anode of the x-ray tube;

process the received sensor data to identify and quantify surface damage to the anode;

store the identified and quantified surface damage with a time stamp; and correlate the identified and quantified surface damage to one or more usage protocols in an operational history record of the x-ray tube and used at a time corresponding the time stamp and/or used at a time in between time stamps.

* * * * *